Figure 1:
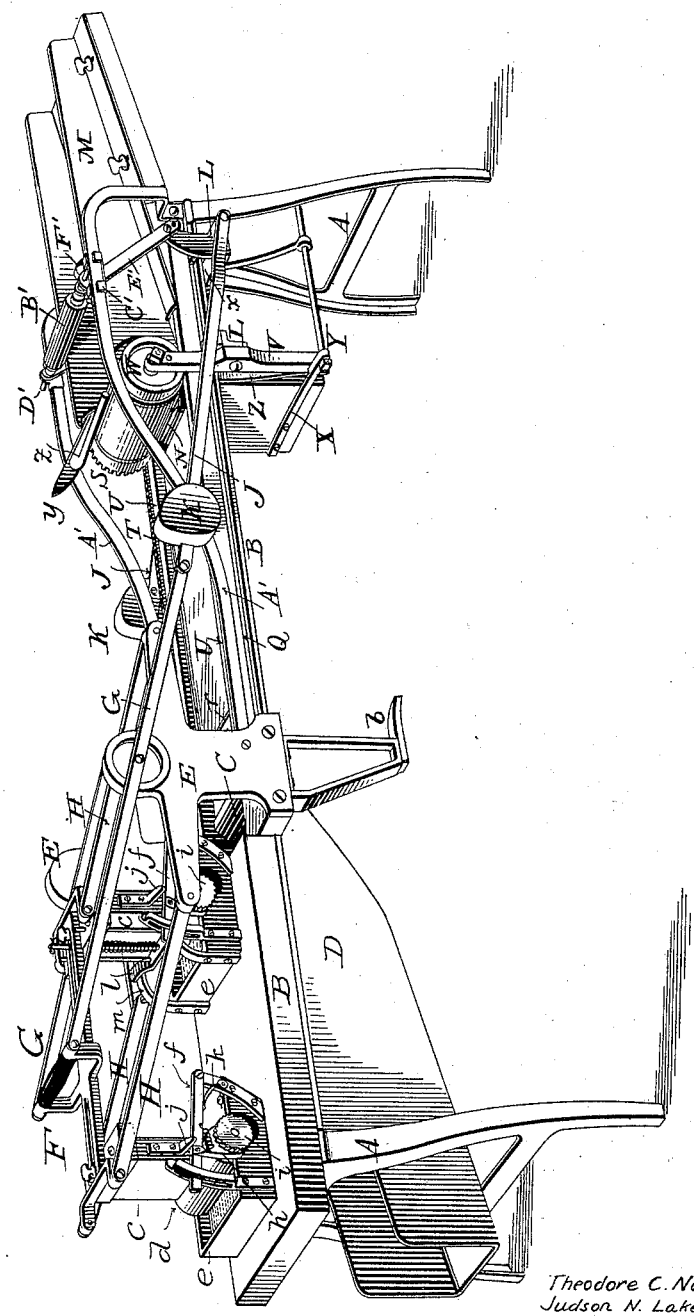

(No Model.) 5 Sheets—Sheet 1.

T. C. NORTHCOTT, J. N. LAKE & J. CLARK.
CAN LABELING MACHINE.

No. 606,227. Patented June 28, 1898.

Witnesses
[signature]
C. B. Bull.

Theodore C. Northcott
Judson N. Lake.
Jasper Clark
Inventors by Dodge & Sons
Attorneys (No Model.) 5 Sheets—Sheet 2.
T. C. NORTHCOTT, J. N. LAKE & J. CLARK.
CAN LABELING MACHINE.
No. 606,227. Patented June 28, 1898.
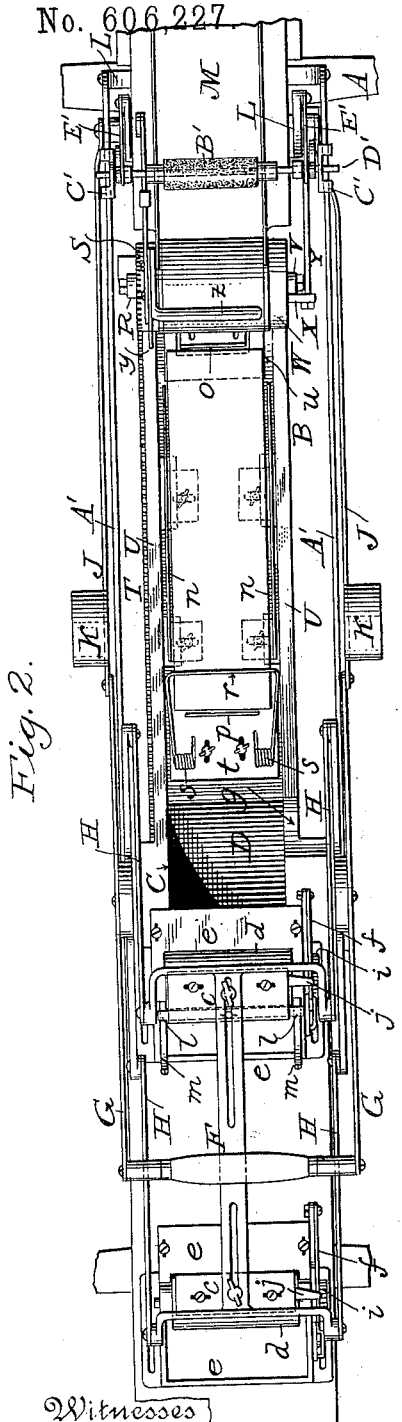
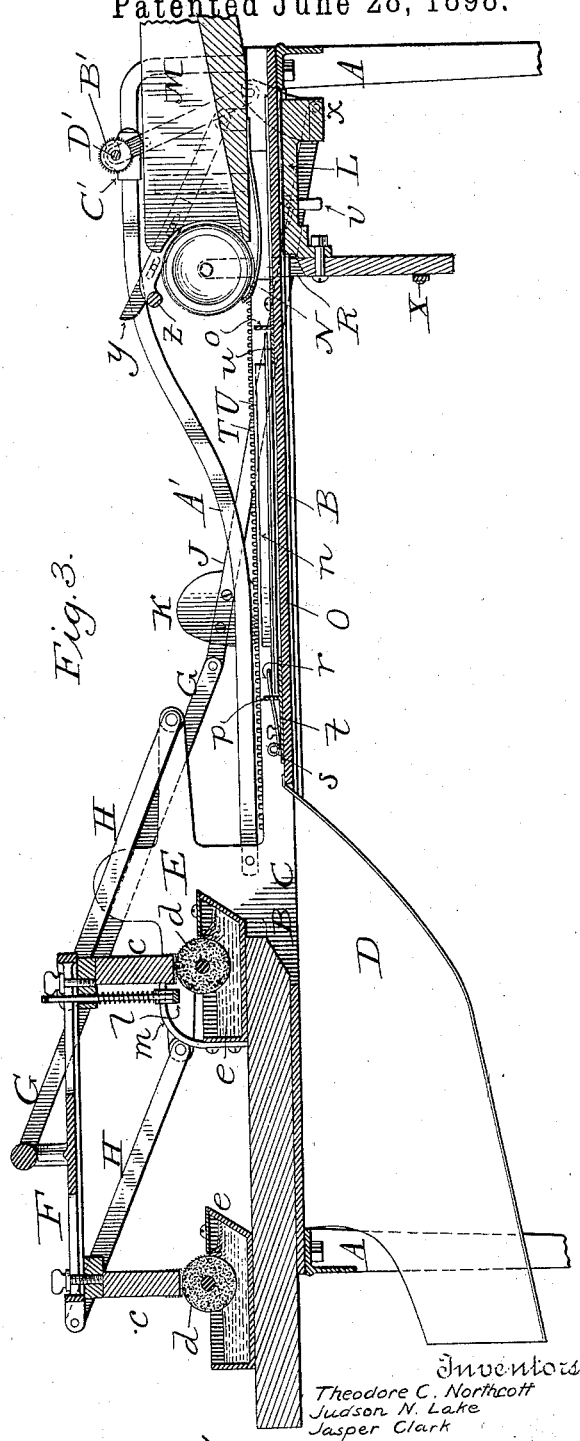
Witnesses
C. C. Bundine
E. B. Bull
Inventors:
Theodore C. Northcott
Judson N. Lake
Jasper Clark
by Dodge & Sons, Attorneys.

(No Model.) 5 Sheets—Sheet 3.
T. C. NORTHCOTT, J. N. LAKE & J. CLARK.
CAN LABELING MACHINE.
No. 606,227. Patented June 28, 1898.

(No Model.) 5 Sheets—Sheet 4.
T. C. NORTHCOTT, J. N. LAKE & J. CLARK.
CAN LABELING MACHINE.
No. 606,227. Patented June 28, 1898.
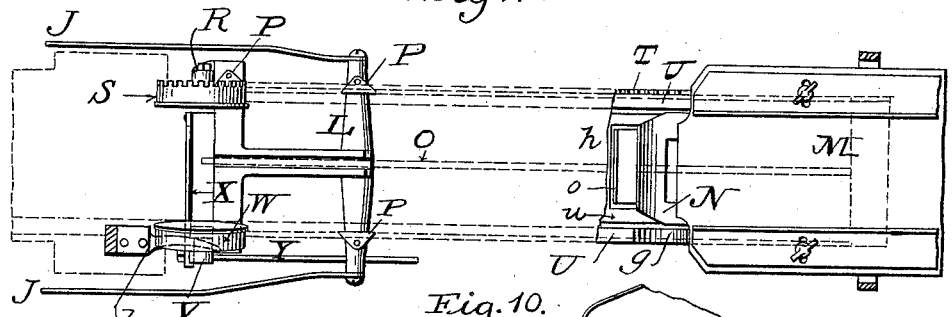
Fig. 7.
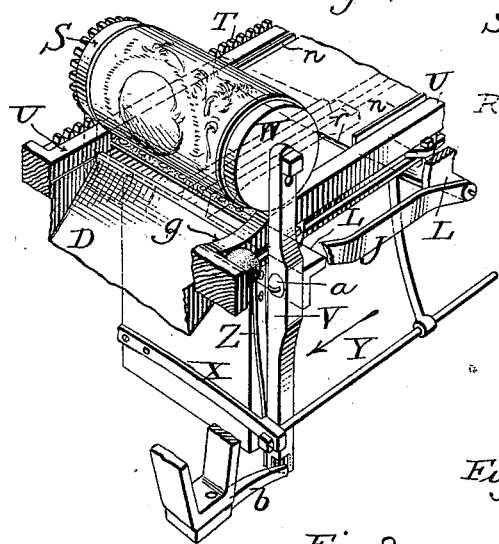
Fig. 8.
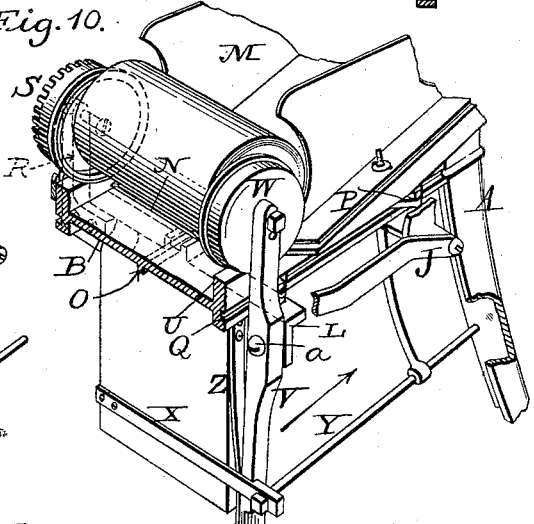
Fig. 10.
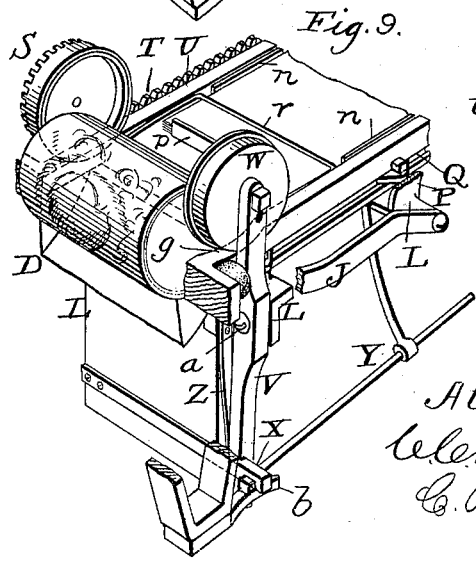
Fig. 9.
Fig. 11.
Attest
W. C. Bundine
C. B. Bull
Inventors,
Theo. C. Northcott
Judson N. Lake
Jasper Clark
by Dodge Sons
Att'ys.

(No Model.) 5 Sheets—Sheet 5.

T. C. NORTHCOTT, J. N. LAKE & J. CLARK.
CAN LABELING MACHINE.

No. 606,227. Patented June 28, 1898.

Theodore C. Northcott,
Judson N. Lake,
Jasper Clark,
Inventors by Dodge Sons,
Attorneys.

Witnesses

UNITED STATES PATENT OFFICE.

THEODORE C. NORTHCOTT, JUDSON N. LAKE, AND JASPER CLARK, OF ELMIRA, NEW YORK; SAID CLARK ASSIGNOR TO SAID NORTHCOTT.

CAN-LABELING MACHINE.

SPECIFICATION forming part of Letters Patent No. 606,227, dated June 28, 1898.

Application filed January 19, 1895. Renewed March 12, 1898. Serial No. 673,668. (No model.)

*To all whom it may concern:*

Be it known that we, THEODORE C. NORTHCOTT, JUDSON N. LAKE, and JASPER CLARK, citizens of the United States, residing at Elmira, in the county of Chemung and State of New York, have invented certain new and useful Improvements in Can-Labeling Machines, of which the following is a specification.

Our invention relates to machines for applying labels to cans and similar articles; and it consists in various features, details, and combinations hereinafter particularly set forth and claimed.

The application of labels to cans by machinery is open to two objections, to wit: First, the labels are not tightly wrapped about the cans, and, second, the paste becomes smeared on the outside of the label at the lap or joint. Unless the label is tightly applied to or wrapped about the can it readily becomes torn or detached in handling, as it is the custom to apply paste only to the end portions of the label, leaving the greater part of the label uncoated and free to be detached from the can in case it should be torn. Where paste is left on the outside of the label, the label of one can is caused to stick or adhere to the label of the adjacent can when the cans are packed for shipment, with the result that the attempted removal of the cans from their cases or boxes causes the tearing or destruction of the label. Our present invention is designed to avoid these objections—that is to say, to produce a machine which shall wrap the label tightly about the can, and, secondly, to produce a machine which will apply the label without leaving any paste on the outer face of the same.

Another important consideration is to produce a machine which shall be simple in construction, cheap, easy of operation, one that can be readily changed to adapt it to labeling cans of different sizes, and, finally, to produce a machine that can be readily repaired by any mechanic in case it should be broken or disabled.

With these objects in view we construct the machine as represented in the accompanying drawings, in which—

Figure 4:
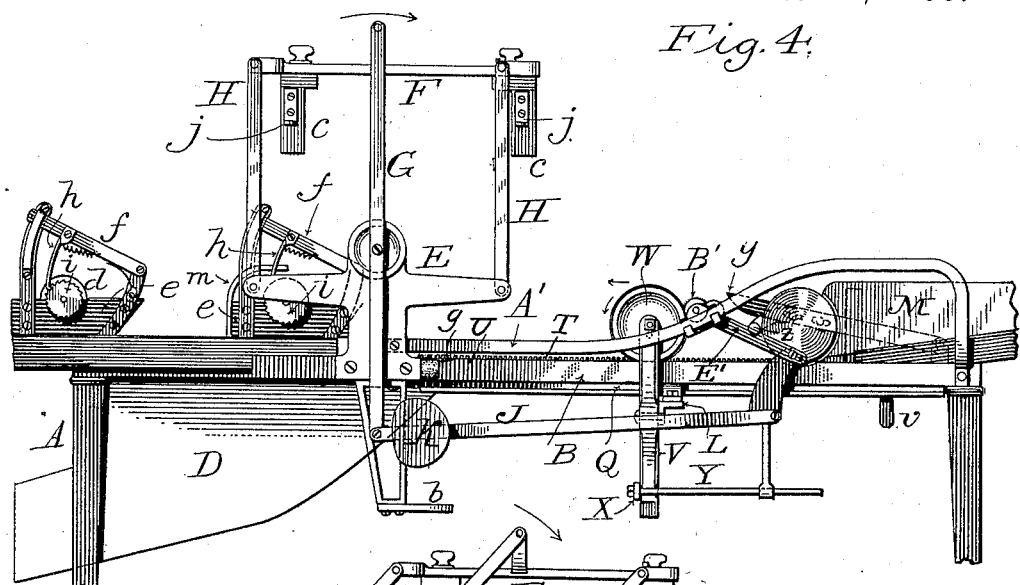
Figure 5:
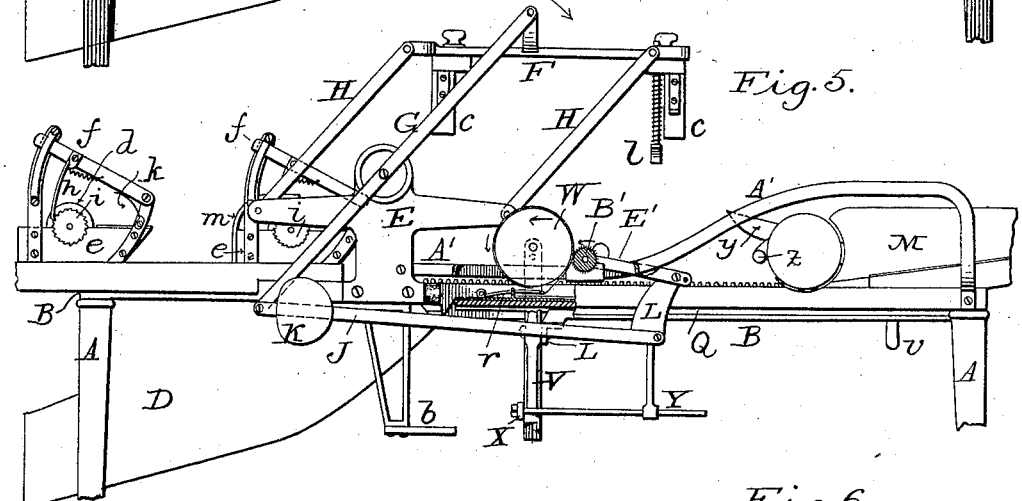
Figure 6:
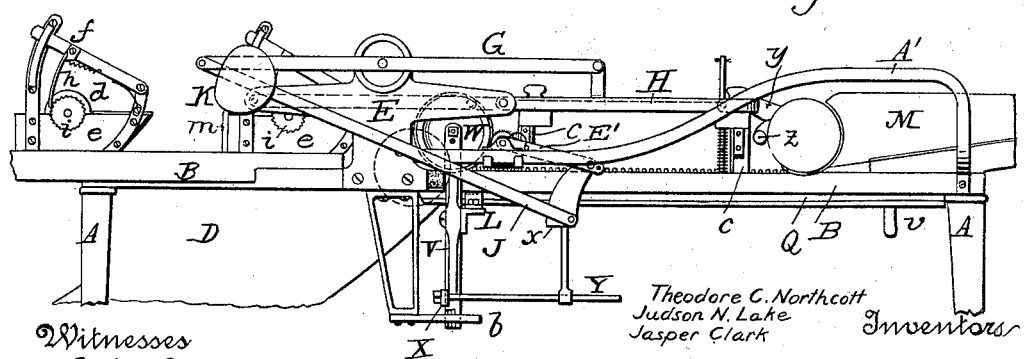
Figure 12:
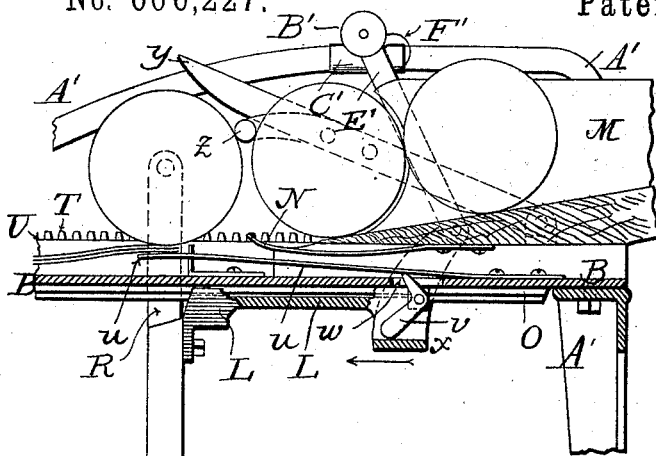
Figure 13:
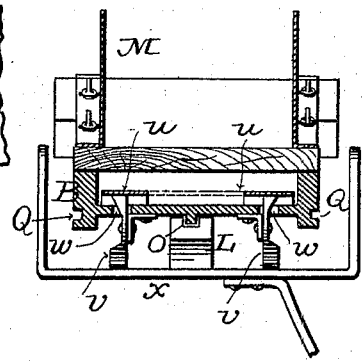
Figure 14:
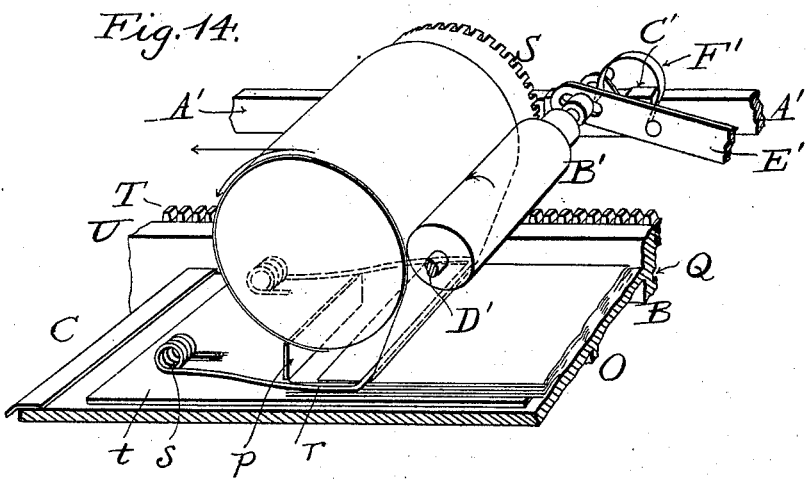
Figure 15:
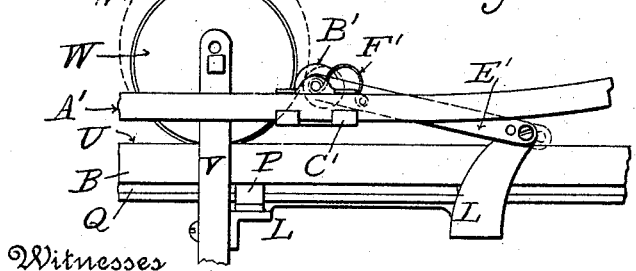

Figure 1 is a perspective view of our improved machine; Fig. 2, a top plan view; Fig. 3, a vertical longitudinal sectional view; Figs. 4, 5, and 6, side views showing the parts in different positions; Fig. 7, a plan view of a portion of the machine with parts broken away; Figs. 8, 9, 10, and 11, perspective views illustrating the construction and operation of the can grasping, traversing, and releasing mechanism; Fig. 12, a vertical sectional view through the can trough or chute, showing the mechanism by which the label is thrown up into contact with the can. Fig. 13 is a vertical transverse sectional view of the same mechanism; Fig. 14, a sectional perspective view illustrating the mechanism for removing the surplus paste from the ends of the label; and Fig. 15, a side elevation of the can grasping and traversing mechanism with the pressure-roller, showing the manner of adapting the machine to different-sized cans.

The main frame comprises the legs A A and the bed B, the latter being provided with an opening C and a trough or chute D beneath the opening, as shown in Figs. 1, 2, 3, 4, 5, and 6.

Projecting upward from the sides of the bed B opposite the opening C are the brackets or uprights E, Figs. 1 to 6, to which the pivoted paste-applying frame F is applied.

The frame F is pivoted at its top at the center to the levers G, which in turn are pivoted to the upper ends of the brackets, and said frame F is further connected at its ends with the said brackets by links H H, the construction and arrangement being such as to permit the frame to swing through an arc of about one hundred and eighty degrees from the paste-receptacles over to the runway for the cans, where the package of labels is placed, and back again.

The levers G are pivoted at a point between their ends to the brackets E and are connected by means of links J J to the reciprocating frame or cross-head L of the can-moving mechanism, these parts being so arranged relatively to each other that the frame F and the can-moving devices travel simultaneously in opposite directions upon the actuation or swinging of the frame, as will be understood upon reference to Figs. 4, 5, and 6.

The links J J are each provided with a weight K, which weights serve to counterbalance the frame F.

The frame F is provided with depending paste-applying blocks c, which are adjustable lengthwise and transversely upon or relatively to the frame in order that the said blocks may apply paste to labels of different sizes, the lower faces of the blocks c being advisably covered with cloth or other partially-absorbent material in order to more properly carry and distribute the paste. These blocks receive their supply of paste from rollers d d, which work in paste boxes or troughs e, secured upon the bed B, as shown in Figs. 1, 2, 3, 4, 5, and 6. At the side of each paste-box is a lever f, which is provided with a pawl h to engage a ratchet-wheel i on the end of the roller-shaft, said lever being arranged in position to be depressed by a lug or finger j, projecting from the side of the paste-blocks, as shown in Figs. 1 and 2. The levers are returned to normal position by means of light springs k, as shown in Figs. 4, 5, and 6. From this description it will be seen that every time the frame F is brought or moved to the left the paste-rollers d will be given a partial rotation in the paste contained within the tanks or boxes e, and as the paste-applying blocks c are brought down onto the periphery of the rollers the amount of paste transferred from the rollers to the said blocks will be uniform and little, if any, in excess of the requirements.

Secured to the frame F adjacent to the right-hand block c is a spring-pressed plate or cross-bar l, Figs. 1, 3, and 5, which acts as a stripper and serves to hold the label in the trough or runway when the paste-applying blocks are lifted up off the labels. In order that this stripper may not come in contact with the paste-applying roller d, the end of the bar forming the stripper is arranged to rest upon an arm or arms m, secured to one of the paste-boxes e, as shown in Fig. 3. From this it will be seen that when the frame F is swung over to the left and the blocks c are brought nearly to the rollers d the bar l will have its downward motion arrested by the arm or arms m, while the frame F, with its blocks, may be moved downward far enough to bring the blocks onto the paste-distributing rollers.

That portion of the bed B between the receiving-chute M and the opening C constitutes a runway or trough for the cans, and in this runway or trough a package of labels is laid face downward. The labels are held in proper position and prevented from moving laterally by means of plates or guards n, Figs. 2 and 3, whose supports extend downward through the bed or table and are slotted or otherwise made adjustable, as indicated by dotted lines in Fig. 2, in order to permit them to properly center labels of different widths. There are also secured within the runway or trough, at right angles to the guards or plates n, adjustable stops or flanged plates o and p, Figs. 2, 3, 12, and 14, which prevent endwise movement of the labels within the runway or trough. These guards, stops, or plates constitute the side walls of a label-holder, and they are so arranged upon the bed or main frame of the machine that when the pivoted frame F is swung over to the right, as shown in Fig. 6, the paste-applying blocks c will come down upon and apply paste to the ends of the label. At one end of the runway or trough there is a scraper r, Figs. 2, 3, and 14, which extends transversely across and is held down upon the labels with a yielding pressure. In the preferred construction of this device it constitutes a bail, with its ends formed into springs s, as shown in the drawings, the said bail being secured to a plate t, which is adjustable upon or with reference to the bed and which can also carry the guard or stop p. At the opposite end of the runway or trough is a lifting-plate u, which is so constructed and arranged that when the can leaves the chute M the said plate will be raised to bring the coated end of the label positively up against the can, and thus insure the proper engagement of the label with the can. In order to effect this automatic raising of the end of the label by means of the plate u, we employ one or more elbow-levers v, Figs. 12 and 13, which are pivoted to the under side of the bed B or to brackets secured thereto and work up through openings w, formed in the bed B. The lower ends of the elbow-levers, which will advisably be weighted, as shown, are arranged in position to be acted upon by a cross-bar x, secured to or forming part of the reciprocating frame or cross-head L. When the reciprocating frame L moves to the right, its cross-bar x, striking the lower end of the lever v, withdraws the nose of the lever and allows the plate u, which is preferably made elastic, to maintain its normal position, the lower end of the lever v riding in front of the cross-bar x. Now when the frame L moves in the direction of the arrow in Fig. 12 the front edge of the cross-bar striking against the rear face of the lever v causes said lever to tip or rock upon its pivot and to carry its nose up above the top face of the bed B, and as the lever thus rocks its nose, bearing upon the under side of the spring-plate u, raises said plate and the labels resting thereon high enough to bring the uppermost and previously-coated label into contact with the can, so that the label shall be taken up by the can as the latter is carried forward.

Inasmuch as the can-moving devices are carried by the frame L, the label is certain to be elevated at the proper moment under all conditions. This plate or lifter u is cut away at the center, as shown in Fig. 13, in order to straddle the stop o.

While we have shown two levers v and a cross-bar x, adapted to act upon both levers, we do not intend to restrict ourselves to this precise construction, as it is obvious that many changes could readily be made without in any manner departing from the spirit of our invention.

At the receiving end of the machine there is a trough M, in which the cans are placed, and at the lower end of the trough, which is advisably inclined to allow the cans to roll down by gravity, there is a curved arm or detent N, Figs. 2, 7, and 12, which assists in preventing the cans from running out of the trough accidentally and holds the lowermost can in position to be grasped by the can-grasping devices, the side walls of the trough being cut away, as shown in Figs. 1 to 6, to permit the entrance of the can grasping and moving devices. The momentum of the filled cans within the trough might in some cases be sufficient to carry the cans over or beyond the arm or plate N, and to guard against this and to insure the arrest of the lowermost can upon the arm or plate N we pivot to the main frame an arm $y$, Figs. 2 to 6, and provide said arm with a lateral finger $z$, which extends in front of the lowermost can and prevents it rolling from the arm or plate N. The end of the arm $y$ extends forwardly in advance of the finger $z$ and is designed to be raised by the can-grasping disk S when the said disk is brought to the position shown in Figs. 1, 2, and 3, the construction and arrangement being such that the lowermost can is released by the finger at the instant that it is grasped by the can-traversing disks, hereinafter described in detail.

The cross-head or frame L of the can-actuating mechanism slides upon a rib or guide O on the under side of bed B, Figs. 3, 7, 10, 11, 12, 13, and 14, and is further guided and sustained in position by means of blocks, arms, or fingers P, which are carried by the frame or cross-head and work in grooves Q, formed in the sides of the bed B, as shown in Figs. 4 and 7 to 11, inclusive.

Secured to one side of the frame L is an upright arm R, which carries at its upper end a disk S, which disk, as shown in Figs. 1, 2, 7, 9, 10, and 11, is provided with teeth to engage a rack-bar T, secured to the bed B, the upper face of the bed at the side edges being dressed off or finished to form suitable tracks U for the can-grasping disks, as shown in Figs. 7, 8, 9, 10, and 11. At the side opposite the arm R and disk S the frame L is provided with an arm V and disk W, the arm V being pivoted at a point between its ends, as at $a$, so that the disk W, carried by the said arm, may be tipped out of the vertical toward and from the companion disk S, and thus alternately grasp and release the interposed can.

Arm V is adapted to be engaged at its lower end by a spring-hook X, so as to hold the disk in an inclined position during the backward travel of the frame L; but when the frame reaches the limit of its backward travel this spring-catch is thrown out by means of a rod Y, secured to the spring arm or catch, striking against one of the legs A or any other suitable stop. As soon as thus released a spring Z, carried by the frame L and bearing against arm V, throws the latter outward at its lower end and carries the disk W into a true vertical position and against the end of the can, the can being thus clamped between the two disks S and W.

Secured to the main frame just below the bracket E is a cam $b$, which is in the path of the depending arm V on the reciprocating frame or cross-head L, as shown in Figs. 1, 4, 5, 6, 7, 9, 10, and 11. When the arm V moves up to and strikes the cam $b$, the lower end of the said arm V is forced inward, so as to be engaged and held by the spring-catch X. This rocking of the arm V on its pivot $a$ causes the disk W to be carried away from the end of the can, whereupon the latter will roll down through the opening C into the trough.

The disks S and W are of a diameter slightly less than that of the can, so that the latter may press with some force upon the coated label. It will also be noted that the disks are flanged, so as to prevent their moving away from the ends of and thereby releasing the can. In order to permit the disk W to move laterally at opposite ends of the track or way U, the latter is cut away on its top edge, as at $g$, Figs. 2, 8, 9, 10, and 11. The can after being grasped by the disks is rolled over the pasted label, which is placed upon the label-holding bed. Secured to the opposite sides of the main frame are the tracks or rails A', which at the receiving end of the machine are raised above the cans. From this point the tracks or rails curve or incline downward toward the discharge-opening, as shown in Figs. 1, 3, 4, 5, and 6.

B' indicates a roller which may be made of rubber or other suitable material and which is carried in boxes or housings C', which are fitted and adapted to slide freely upon the tracks or rails A'. The shaft D' of the roller B' passes at its ends through slots formed at the upper end of a pair of levers E', which levers are pivoted at their lower ends to the reciprocating frame or cross-head L, as indicated in Figs. 1, 3, 4, 5, 6, and 12, a spring F', secured at one end to the levers and bearing at its opposite end against the shaft D', tending always to hold the shaft toward the upper end of the slot in the lever, as will be seen upon reference to Fig. 14. This roller is designed to press the label against the body of the can, and thus insure a smooth application of the label and the perfect lapping of the end thereof.

The operation of the machine is as follows, assuming the paste-boxes to be filled with paste, one or more labels to have been placed in the runway or trough, and the parts being brought to the position shown in Figs. 1 and 2: From an examination of these figures it will be noticed that the paste-applying blocks $c$ are now resting upon the distributing-rollers $d$, and the lower faces of the blocks will be coated with paste. It will also be noticed that the can-grasping disks W and S have already taken hold of the can. If the frame F be now lifted slightly, the can will be carried forward a slight distance and the lifting-plate $u$ will bring the label up against the under side of the can, as represented in Fig. 12. The roller B' has also been moved forward a short distance, but not far enough to bear upon the can. Continuing this movement of the frame F and bringing the parts to the position shown in Fig. 4, it will be seen that the roller B' has been moved down the track far enough to bear upon the can and to press the label tightly against the same, the roller being turned or rotated by frictional engagement with the can. During this movement of the can over the label the label is prevented from curling up at the end and from getting misplaced by reason of the scraper $r$. When the parts reach the position indicated in Figs. 5 and 14, the label will begin to be withdrawn from under the bail or scraper $r$, and any surplus paste on the lapping end of the label will be removed or scraped off by this bail or scraper $r$. The roller B' still presses against the label and does not move away from the can until the latter is discharged, thus insuring an even lapping of the label. When the can has been moved far enough to complete the labeling operation, the paste-applying blocks $c$, carried by the arm F, will have been brought down onto the labels in the trough or runway, as indicated in Fig. 6, thus coating the label at its ends preparatory to a repetition of the operations just described. When the can has been discharged and the paste applied to the uppermost label, as just mentioned, the frame F is swung to the left and brought back to the position represented in Figs. 1, 2, and 3.

It will be noticed that the upright arms R and V, which carry disks S and W, are provided with two sets of holes, so as to enable the said arms to carry disks of different diameters, diameters corresponding to the two and three pound cans commonly used.

In order that the roller B' may bear upon the smaller-sized can, the levers E' are also provided with two holes, by means of which the roller can be carried forward a distance equal to the difference in the diameter of the cans to be labeled.

Having thus described our invention, what we claim is—

1. In combination with the main frame having a label-holder; a mechanism for rolling the can over the label; and a device operated through said can-rolling mechanism for raising or lifting one end of the label.

2. In combination with the main frame provided with a label-holder and paste-boxes; a can-traversing mechanism; a pivoted paste-applying frame operatively connected with the can-traversing mechanism; and a device operated by the traversing mechanism to lift the end of the label.

3. In combination with the main frame, the reciprocating frame L, having the cross-bar $x$; the plate $u$; and the lever $v$ arranged in position to be acted upon by the bar $x$.

4. In combination with a label-holder and mechanism for applying paste to the labels and for rolling a can over the label, the adjustable spring-scraper $r$, adapted to bear upon the labels near one end and to be adjusted for labels of different lengths, substantially as shown and described.

5. In a can-labeling machine, the combination with a track or way; of a can-traversing mechanism mounted upon said way or track; a second track; and a roller independent of the can-traversing mechanism, mounted upon the second track and arranged to press the label against the can.

6. In a can-labeling machine, the combination with a track or way; of a can-traversing mechanism mounted upon said way or track; a second track; a roller independent of the can-traversing mechanism, mounted upon the second track and arranged to press the label against the can; and a connection between the roller and the can-traversing mechanism.

7. In combination with a can-traversing mechanism and the tracks A'; the roller B' provided with boxes C' to fit upon the tracks; and the levers E' connected with the can-traversing mechanism and the roller-shaft.

8. In combination with a can-traversing mechanism, and the tracks A'; the roller B' provided with housings C'; the slotted levers E' connected with the can-traversing mechanism; and the springs F' to force the roller against the can.

9. In a can-labeling machine, the combination with a bed or way and a chute at the end thereof; a can-traversing mechanism mounted to travel on said way toward and from the chute; a roller to press the label against the can; and means whereby the roller is caused to press the label against the can, and to rise above the chute to clear the cans therein.

10. In a can-labeling machine, the combination with a bed; of tracks on opposite sides thereof; two can-grasping disks mounted to run directly upon the tracks; and means for moving one of said disks toward and from the other.

11. In a can-labeling machine, the combination with a bed; of tracks on opposite sides thereof, one of said tracks being cut away on its upper face, as at $g$; and means for moving one of said disks toward and from the other.

12. In combination with a track and a bed; a reciprocating cross-head or frame; the rigid arm R provided with disk S; the pivoted arm V provided with disk W; the spring-catch X to engage and hold the arm V; the rod Y and a stop to disengage the catch; and the cam $b$ to act upon and rock the arm V.

13. In a can-labeling machine, the combination with a bed; of a smooth track and a rack-bar on opposite sides thereof; two can-grasping disks, one of which is toothed and the other plain, running directly upon the rack-bar and smooth track respectively; and means for moving the plain-faced disk toward and from the toothed disk.

14. In a can-labeling machine, the combination with a bed or support to receive the labels; of a pair of disks between which the can is held; devices at opposite ends of the bed for causing the disks to automatically grasp and release the cans; and means whereby the said disks are held in their open or release position during their return movement.

15. In a can-labeling machine, the combination with a bed or support to receive the labels; of a track; a pair of can-grasping disks mounted to travel upon the track; and means whereby one of said disks is tipped out of a vertical plane to release the can, and returned to position to grasp the can.

16. In a can-labeling machine, the combination with a main frame provided with paste-boxes, a label-holder, and an intermediate can-discharge orifice; of a frame pivoted to the main frame between the paste-boxes and the label-holder and provided with paste-applying blocks; said pivoted frame being arranged to swing back and forth from the paste-boxes to the labels.

17. In a can-labeling machine, the combination with a main frame provided with paste-boxes, a label-holder, and an intermediate can-discharge orifice; of a frame pivoted to the main frame and provided with paste-applying blocks, said pivoted frame being arranged to swing back and forth from the paste-boxes to the label; and a can-traversing mechanism operated by or through said pivoted frame.

18. In a can-labeling machine, the combination with a main frame and its paste-boxes, label-holder, and can-discharge orifice; of the pivoted frame provided with paste-applying blocks; a can-traversing mechanism operated by the swinging frame; and means for causing said can-grasping mechanism to automatically grasp and release the cans.

19. In a can-labeling machine, the combination with a track; of a reciprocating frame provided with the arms R and V having two or more holes; and the removable and interchangeable disks applied to said arms to run upon the track.

20. In a can-labeling machine, the combination with a track; of a reciprocating frame provided with arms R and V; removable and interchangeable disks applied to said arms to run upon the track; an arm E' adjustably secured to the frame; and a presser-roll B' carried by the arm.

21. In a can-labeling machine, the combination with a track; of a reciprocating frame having arms R and V which move in or have fixed relation to the track; and removable and interchangeable can-grasping disks secured to said arms to run upon the track.

In witness whereof we hereunto set our hands in the presence of two witnesses.

THEODORE C. NORTHCOTT.
JUDSON N. LAKE.
JASPER CLARK.

Witnesses:
E. A. PRENTICE,
L. D. SHOEMAKER.